Feb. 5, 1952 W. M. SMITH 2,584,748
VACUUM TUBE REGULATING APPARATUS
Original Filed March 24, 1945
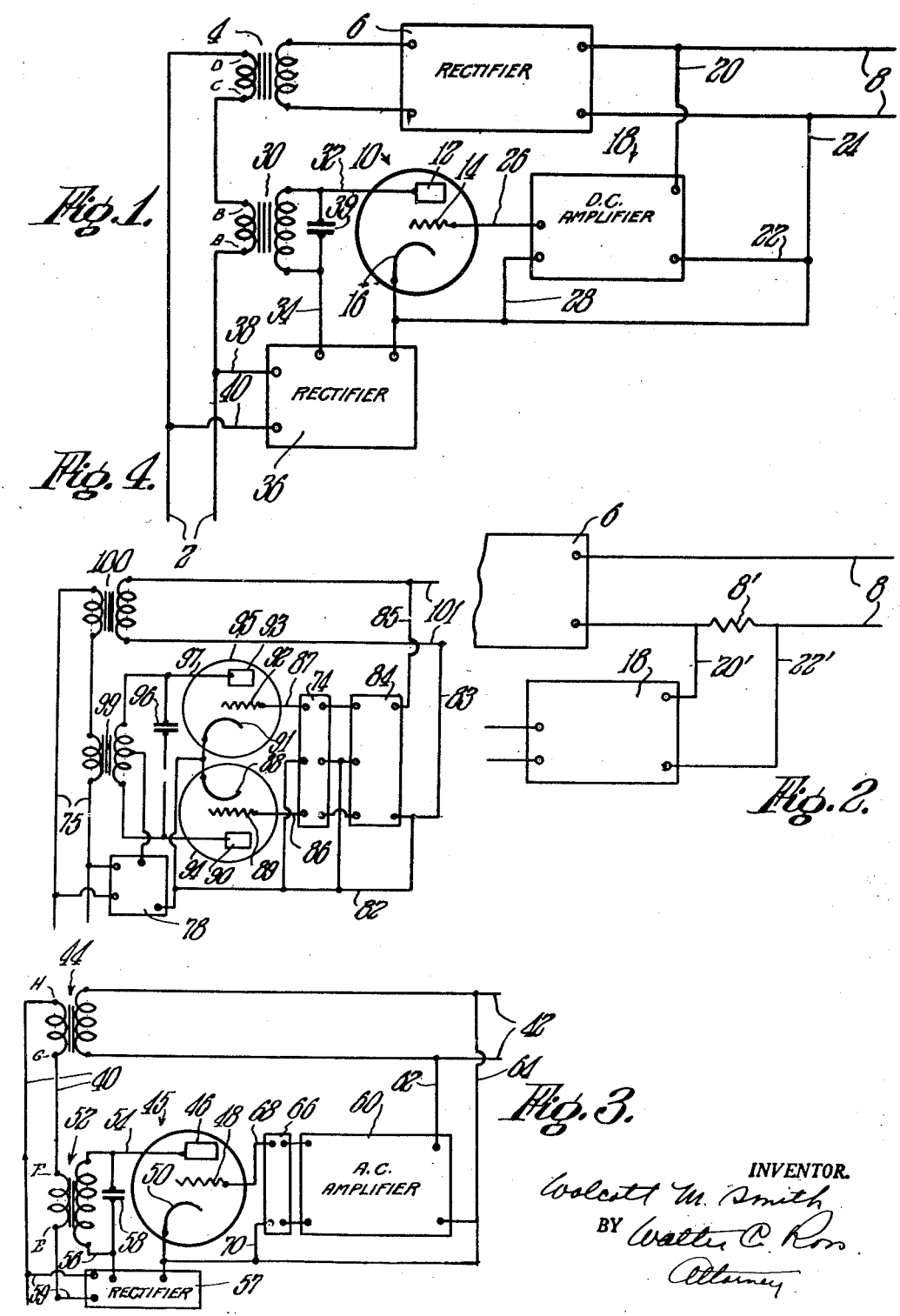
INVENTOR.
Wolcott M. Smith
BY Walter C. Ross
Attorney Patented Feb. 5, 1952

2,584,748

UNITED STATES PATENT OFFICE 2,584,748

VACUUM TUBE REGULATING APPARATUS

Wolcott M. Smith, Springfield, Mass., assignor, by mesne assignments, to General Instrument Corporation, Elizabeth, N. J., a corporation of New Jersey Original application March 24, 1945, Serial No. 584,714. Divided and this application July 26, 1946, Serial No. 686,283

10 Claims. (Cl. 321—24)

This invention relates to regulating apparatus and the principal objects of the invention are directed to vacuum tube regulating apparatus adapted for the close regulation and control of either alternating or direct current or both together when operated from an A. C. source.

This is a division of application Serial Number 584,714 filed March 24, 1945, now abandoned.

Regulators of the vacuum tube type heretofore known operate on the direct current portion of the power supply and do not regulate filament and other voltages while certain forms of A. C. regulators operate in the supply alone and have no direct relationship to the portion of the load in which the user may be interested.

According to this invention, apparatus is provided which will regulate either D. C. or A. C. or both and may be adapted to either voltage or current regulation so as to be adaptable for regulating functions generally.

A principal object of the invention is the provision of means in regulating apparatus whereby the regulation of either A. C. or D. C. or both from the load circuit is accomplished so that regulation is directly responsive either to line or to load variations.

Other novel objects and advantages will be observed from the following description of the invention in the form thereof at present preferred with reference to the accompanying drawings wherein:

Fig. 1 is a diagrammatic figure showing the apparatus embodying the basic novel features of the invention;

Fig. 2 is a partial view similar to Fig. 1 to explain current regulating features of the invention; and Fig. 3 is a view similar to Fig. 1 to explain A. C. regulating features of the invention.

Fig. 4 is a partial view to demonstrate operation with a full-wave arrangement.

Referring now to the drawings more in detail, the invention will be fully described.

An A. C. supply line is represented by 2 which is coupled in the usual manner through a transformer 4 to a rectifier 6. A filter may or may not be used according to requirements of the load application.

Connections 8 may extend from the rectifier 6 to any apparatus desired and will be called the load line or circuit.

A vacuum tube is represented by 10 which has at least a plate, grid and cathode 12, 14 and 16. Although not shown, this tube will have the usual heating filament and current supply or other heating means for operation of the tube in the well known manner. Its cathode may be the heater proper in some tube types.

A direct current amplifier is represented by 18 and at one side it is connected by 20, 22 and 24 to the load line 8. The other side of the amplifier 18 is connected by 26 to the grid and by 28 to 24 which extends to the cathode 16.

A transformer 30 has its primary in series with one side of the supply line 2 while its secondary has one end connected by 32 to the plate 12 of tube 10 and its other end connected by 34 to the output side of a rectifier 36. The cathode 16 and line 24 are connected to the output side of rectifier 36, as shown. The input side of said rectifier 36 is connected by 38 and 40 to the supply line 2. A condenser 39 is connected across the secondary of transformer 30, as shown.

With the characteristics of the various components selected and so arranged as to function for the desired results, an increase in voltage across the load line 8 in Fig. 1 is carried by 20 and 22 through the D. C. amplifier 18 to the grid 14 of the tube 10 thereby increasing the plate current flow of said tube.

The condenser 39 causes the voltage across the primary of transformer 4 to be approximately ninety degrees out of phase with the voltage across the primary of the transformer 30 when the plate current of tube 10 is zero. The ninety degree component of voltage which appears across A and B of transformer 30 does not affect the voltage at C and D of transformer 4. The losses in transformer 30 build up an in-phase voltage which does cause a small drop in line voltage to transformer 4 across terminals C and D. As plate current of tube 10 increases, the circuit including condenser 39 and transformer 30 is loaded thereby so that its losses are increased and the in-phase component across A and B increase, thereby lowering the voltage across transformer 4 and so on to the load circuit wherein the voltage increase appeared.

The D. C. amplifier 18 may be such as to develop a considerable gain over the voltage change on the load circuit. For instance where the amplifier gain may be 200 a variation of voltage in the load line of .01 volt would be represented by two volts at the grid of tube 10. This brings about instantaneous and accurate correction.

The rectifier 36, although not essential, improves the operation in that it improves the response of tube 10 by causing continuous plate current flow and, therefore, continuous loading of transformer 30 throughout the A. C. supply cycle. Similar action can be shown to occur when tube 10 is carrying some plate current and the load voltage across 8 decreases. The plate current of tube 10 is decreased, lightening the load on transformer 30 and thereby decreasing the in-phase voltage drop across A—B which allows a greater portion of the supply voltage across 2 to appear across C—D and, hence, through rectifier 6, across 8, tending to restore the original load conditions instantaneously.

In Fig. 2, one side of the load line 8 includes a resistance 8' and is connected by 20' and 22' to the input of the D. C. amplifier. Otherwise the circuits and components may be similar to those in Fig. 1 and the operation is similar except that current variations through resistance 8' are changed to voltage changes into the D. C. amplifier.

In Fig. 3 an A. C. supply line is represented by 40 and a load line by 42. A transformer 44 is provided which couples the supply and load line. A tube 45 has a plate 46, grid 48 and cathode 50. A transformer 52 has a primary connected in the supply line as shown. Its secondary is connected by 54 and 56 to the plate 46 and to the output side of a rectifier 57. A condenser 58 is disposed across the secondary of transformer 52. The input of the rectifier is connected to the supply line by 57.

An A. C. amplifier 60 has its input side connected by 62 to the load line and by 64 to the load line and cathode 50 which cathode is connected to rectifier 57. The output side of the amplifier is connected through a phase shift network and bias supply indicated by 66 to the grid and cathode of tube 44 by 68 and 70.

In the form of the invention shown in Fig. 3, the tube 45 is biased for normal operation and grid 48 is fed from load voltage through amplifier 60.

Operation is similar to that with D. C. work except that the voltage fed to grid 48 of tube 45 is phased so that the A. C. voltage which appears across E—F of transformer 52 due to tube 45 is additive to that developed by the losses in transformer 52 so that changes in input to grid 48 caused by input variations to amplifier 60 cause an inverse variation in voltage across G—H and, hence, across the secondary of 44 thereby restoring the original load conditions instantaneously.

In Fig. 4 a supply line is represented by 75 and is connected to the input side of a rectifier 76 as shown. Said line 75 is coupled to a load line 85 through a transformer 100. Tubes 94 and 95 have plates 90 and 93, guides 89 and 92, and cathodes 88 and 91.

A transformer 99 has a primary in the line 75 while opposite ends of its secondary are connected to the plates 90 and 93 with a condenser across the secondary. A rectifier 78 has its input connected to the line 75 and its output connected to the transformer secondary and cathodes 88 and 91, as shown.

An A. C. amplifier has its input connected to the load line by 83 and 85. Said line 83 is connected by 82 to the cathodes of the tube. A phase shifter 74 has its input connected to the output of amplifier 84 and its output connected to the grids 89 and 92 by 86 and 87. Intermediate connections extend from line 82 to the center of the components 74 and 84.

In Fig. 4, tube 94 has been added to the circuit of Fig. 3, its advantage being to further increase the sensitivity of the device. This arrangement is particularly advantageous in the A. C. form since the tubes may be operated so as to pass but a small direct current through the balanced secondary, thereby assuring a more nearly 90° phase shift for the voltage across the primary of transformer 99.

The rectifiers and amplifier referred to may take any form desired such as used in connection with radio-electronic apparatus and are not shown in detail since one skilled in the art will select those best suited for the purpose.

From the foregoing it will be seen that the apparatus is adapted for the regulation of either D. C. or A. C. or both and for regulating either voltage or current.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A vacuum tube regulating apparatus comprising in combination, an A. C. supply line, a load line connected through a rectifier to the supply line, a vacuum tube including at least plate, grid and cathode, a transformer having a primary in the supply line and one end of its secondary connected to said plate, a rectifier having an input side connected to said supply line and an output connected to said cathode and to said plate through said secondary, a condenser across said secondary, an amplifier having its output connected to said grid and to said cathode, and connections across said load line to the input of said amplifier such that the voltage between said grid and said cathode varies in the same sense as the voltage at said load, thereby causing the current in said secondary to vary in the same sense as the voltage at said load.

2. A vacuum tube regulating apparatus for D. C. current comprising in combination, an A. C. supply line, a load line connected through a rectifier to the supply line, a vacuum tube including at least plate, grid and cathode, a transformer having a primary in the supply line and one end of its secondary connected to said plate, a rectifier having an input side connected to said supply line and an output connected to said cathode and to said plate through said secondary, a condenser across said secondary, an amplifier having its output connected to said grid and to said cathode, connections between one side of said load line and the input of said amplifier and said cathode, and a resistance across said amplifier input line between said load and said first mentioned rectifier, said connections being such that the voltage between said grid and said cathode varies in the same sense as the current through said load, thereby causing the current in said secondary to vary in the same sense as the current through said load.

3. A vacuum tube regulating apparatus comprising in combination, an A. C. supply line, a load line connected through a rectifier to the supply line, a vacuum tube including at least plate, grid and cathode, a transformer having a primary in the supply line and its secondary connected across said cathode and said plate, a condenser across said secondary, an amplifier having its output connected to said grid and to said cathode, and connections across said load line to the input of said amplifier and said cathode such that the voltage between said grid and said cathode varies in the same sense as the voltage across said load, thereby causing the current in said secondary to vary in the same sense as the voltage across said load.

4. A vacuum tube regulating apparatus for D. C. current comprising in combination, an A. C. supply line, a load line connected through a rectifier to the supply line, a vacuum tube including at least plate, grid and cathode, a transformer having a primary in the supply line and its secondary connected across said cathode and said plate, a condenser across said secondary, an amplifier having its output connected to said grid and to said cathode, connections between one side of said load line and the output of said amplifier, and a resistance across said amplifier input line between said load and said first mentioned rectifier said connections being such that the voltage between said grid and said cathode varies in the same sense as the current through said load, thereby causing the current in said secondary to vary in the same sense as the current through said load.

5. A regulating apparatus comprising an A. C. supply, connections including a rectifier and the primary of a transformer between said supply and a load, a secondary of said transformer, a condenser across said secondary, and circuit means connected between said load and said secondary, responsive to the voltage across said load and effective to cause the magnitude of current in said secondary to vary in the same sense as the voltage across said load, whereby said voltage is stabilized.

6. A regulating apparatus comprising an A. C. supply, connections including a rectifier and the primary of a transformer between said supply and the load, a secondary of said transformer, a condenser across said secondary, and circuit means connected between said load and said secondary responsive to the voltage across said load and effective to cause the magnitude of a direct current in said secondary to vary in the same sense as the voltage across said load, whereby said voltage is stabilized.

7. A regulating apparatus comprising an A. C. supply, connections including a rectifier and the primary of a transformer between said supply and a load, a secondary of said transformer, a condenser across said secondary, circuit means connected between said load and said secondary, responsive to the current in said load and effective to cause the magnitude of the current in said secondary to vary in the same sense as the current through said load, whereby said current is stabilized.

8. A vacuum tube regulating apparatus comprising in combination, an A. C. supply line, a load line connected through a rectifier to the supply line, a vacuum tube including at least plate, grid and cathode, a transformer having a primary in the supply line and having its secondary across said plate and said cathode, a D. C. voltage source connected between said plate and said cathode, a condenser across said secondary, and connections across said load line to said cathode and said grid such that the voltage between said cathode and said grid varies in the same sense as the voltage across said load, thereby causing the current in said secondary to vary in the same sense as the voltage across said load.

9. A vacuum tube regulating apparatus comprising in combination, an A. C. supply line, a load line connected through a rectifier to the supply line, a vacuum tube including at least plate, grid and cathode, a transformer having a primary in the supply line and having its secondary across said plate and said cathode, a D. C. voltage source connected between said plate and said cathode, a condenser across said secondary, a resistance in said load line between the load and said rectifier, and connections between the ends of said resistance and said cathode and said grid such that the voltage between said cathode and said grid varies in the same sense as the current through said load line, thereby causing the current in said secondary to vary in the same sense as the current through said load line.

10. A vacuum tube regulating apparatus comprising in combination, an A. C. supply line, a load line connected through a rectifier to the supply line, a vacuum tube including at least plate, grid and cathode, a transformer having a primary in the supply line and having its secondary across said plate and said cathode, a D. C. voltage source connected between said plate and said cathode, a condenser across said secondary, and connections between said cathode and grid and spaced points on said load line such that the voltage between said cathode and said grid varies in the same sense as the voltage difference between said spaced points, thereby causing the current in said secondary to vary in the same sense as the voltage difference between said spaced points.

WOLCOTT M. SMITH.

REFERENCES CITED

The following references are of record in the file of this patent:

UNITED STATES PATENTS

| Number | Name | Date |
| --- | --- | --- |
| 1,893,780 | Lyman | Jan. 10, 1933 |
| 1,993,914 | Bohm | Mar. 12, 1935 |
| 2,018,348 | Dijksterhuis | Oct. 22, 1935 |
| 2,079,500 | Foos | May 4, 1937 |
| 2,175,379 | Dellenbaugh | Oct. 10, 1939 |
| 2,209,948 | Harmer | Aug. 6, 1940 |
| 2,443,006 | Johnson | June 8, 1948 |